US005946399A

United States Patent [19]
Kitaj et al.

[11] Patent Number: 5,946,399
[45] Date of Patent: Aug. 31, 1999

[54] FAIL-SAFE DEVICE DRIVER AND METHOD

[75] Inventors: Paul Thomas Kitaj, Gilbert; Douglas Allen Hardy; Mark Richard Enstone, both of Scottsdale, all of Ariz.

[73] Assignee: Motorola, Inc., Schaumburg, Ill.

[21] Appl. No.: 08/802,043

[22] Filed: Feb. 18, 1997

[51] Int. Cl.⁶ .............................. H04L 9/00; G06F 13/10
[52] U.S. Cl. .................................. 380/49; 380/4; 380/9; 380/50; 380/59; 395/680; 395/681; 365/230.06; 709/301
[58] Field of Search .............................. 380/4, 9, 49, 50, 380/59; 365/230.06, 230.01; 395/680, 681, 682, 683, 684, 685; 709/300, 301; 710/1

[56] References Cited

U.S. PATENT DOCUMENTS

| | | |
|---|---|---|
| 4,987,595 | 1/1991 | Marino, Jr. et al. ...................... 380/50 |
| 5,029,206 | 7/1991 | Marino, Jr. et al. ......................... 380/4 |
| 5,283,828 | 2/1994 | Saunders et al. ........................... 380/4 |
| 5,436,621 | 7/1995 | Macko et al. . |

Primary Examiner—Bernarr E. Gregory
Attorney, Agent, or Firm—Gregory J. Gorrie; Frank J. Bogacz

[57] ABSTRACT

A device driver (104) is used to provide a fail-safe interface between a plurality of client applications and a cryptographic card. Device driver (104) ensures separation between red data, black data, and command data. Device driver (104) uses objects and object handles to control data flow. Device driver (104) uses several simplex channels to control data flow. Each channel is managed separately using its own object, and each channel has unique access protection through the object handles. Within device driver (104), the simplex channel interfaces are kept separate and functional separation of the data and command memory is maintained to provide fail-safe data isolation.

26 Claims, 7 Drawing Sheets

| 340 | ADDRESS |
|---|---|
| COMMAND MAILBOX<br>THE EVENT SCHEDULER SETS UP COMMANDS OR POSSIBLY COMMAND CHAINS IN THIS SPACE | 00 00 00 00 |
| COMMAND CHANNEL A WRITES AND READS | 0000 1000 |
| COMMAND CHANNEL B WRITES AND READS | 0000 2000 |
| DATA CHANNEL (1) READ | 0000 4200 |
| DATA CHANNEL (2) WRITE | 0000 4400 |
| DATA CHANNEL (3) READ | 0000 4800 |
| DATA CHANNEL (4) WRITE | 0000 4E00 |
| ⋮ | 0000 7FFF |
| DATA CHANNEL (1) WRITE | 0300 8200 |
| DATA CHANNEL (2) READ | 0300 8400 |
| DATA CHANNEL (3) WRITE | 0300 8800 |
| DATA CHANNEL (4) READ | 0300 8E00 |
| ⋮ | |

*FIG. 4*

FAIL-SAFE DEVICE DRIVER AND METHOD

FIELD OF THE INVENTION

The present invention pertains to cryptographic devices and, more particularly, to an apparatus and method for providing a fail-safe interface to cryptographic devices.

BACKGROUND OF THE INVENTION

Computer systems can be viewed as having three components: hardware, applications and an operating system. The operating system provides the interface between the hardware and applications. The operating system manages and controls the hardware component on one side and manages and has some control over the applications on the other side.

When a computer system is initialized, the operating system is responsible for establishing a functional alliance between the hardware and applications. The operating system must initialize various hardware components. This is usually done by interfacing with various device drivers.

In some operating systems (e.g., UNIX and Windows NT), the kernel is the core of the operating system. Generally, the kernel interacts directly with the hardware and isolates the hardware from the applications. The kernel also manages the sequential sharing of the central processing unit (CPU). The kernel manages the multi-tasking of the CPU making it relatively invisible to the user.

The United States Government has developed a removable cryptographic card implemented in a Personal Computer Memory Card Interface Association (PCMCIA) device. One specific example is a FORTEZZA PLUS cryptographic card. However, there are several versions of the PCMCIA cryptographic card available today and several more in the design phase.

All of these devices share a common design. In these devices, all of the data passes through a common memory area which can contain red data, black data, and/or command data. As used herein, red data is sensitive data and is also referred to as plain text or non-encrypted data. Also, as used herein, black data is non-sensitive data and is also referred to as cipher text or encrypted data. This creates a problem for high grade cryptographic systems which require separation of red data, black data and command data. Some of the cryptographic cards also permit multiple cryptographic channels to be established. These cards have the additional problem of keeping red data from each individual channel separate. Finally, a high grade cryptographic system must guarantee data separation in a fail-safe manner. The current technology does not provide any assurances that the sensitive and non-sensitive data being sent to the cryptographic card is not being mixed.

What are needed are a method and apparatus for providing data separation across the common memory interface of the cryptographic card.

BRIEF DESCRIPTION OF THE DRAWINGS

A more complete understanding of the present invention can be derived by referring to the detailed description and claims when considered in connection with the figures, wherein like reference numbers refer to similar items throughout the figures, and:

FIG. 4 shows a diagram of the memory map for the shared memory in the cryptographic card in accordance with a preferred embodiment of the present invention;

DETAILED DESCRIPTION OF A PREFERRED EMBODIMENT

Figure 1:
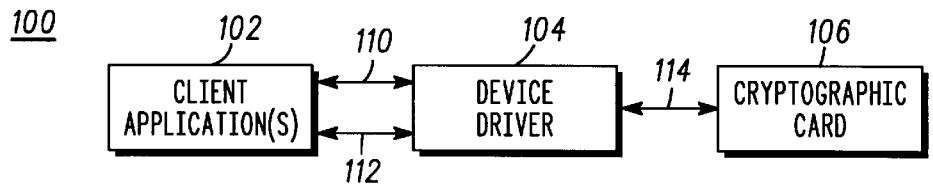
FIG. 1 shows a block diagram of a cryptographic system in accordance with a preferred embodiment of the present invention.

The method and apparatus of the present invention provide a method and apparatus for providing data separation through the common memory interface of the cryptographic card. The present invention separates the interface to the cryptographic card into several independent simplex channels. Each channel is managed separately and has unique access protection. Within the device driver the simplex channel interfaces are kept separate and functional separation of the data and command memory is maintained to provide fail-safe data isolation.

In a preferred embodiment of the present invention, a device driver has been developed for a FORTEZZA PLUS cryptographic card that ensures separation between red data, black data, and command data within the privileged address space of a Windows NT multi-tasking operating system. In this preferred embodiment, commercial off the shelf (COTS) software is utilized for the operating system.

In a preferred embodiment, the device driver is running in a "privileged" mode. For example, "Ring 0" is the designation for this mode for x86 type processors, and "privileged" is the designation for this mode for 88000/PowerPC type processors. Within the architecture of modern multi-tasking operating systems, this means the device driver is running as an operating system device driver.

In a preferred embodiment, the present invention utilizes object oriented kernel objects for data separation and separate software modules performing distinct and isolated functions for operation separation. The present invention has multiple "handles" to its resources or objects. There are two basic types of traffic which flow between client software applications and the cryptographic card through the device driver: command traffic and data traffic. Command channels allow applications to send commands to the cryptographic card. These commands can also result in status information being retrieved. These commands can also cause administrative actions to be performed and can cause command channel and data channel configuration processes to be performed. Data channels allow applications to send user data to the card. This user data requires data transformation which is either an encryption or a decryption function.

In a preferred embodiment, the present invention uses sets of simplex channels to isolate data used in an encryption process from data used in a decryption process. The simplex channels also provide isolation between the red data and the black data. A simplex channel is one, for example, which only handles red (plain text) data which is to be written to the card so that the red (plain text) data can be encrypted. This encryption process transforms the red data into black data. A separate simplex channel is dedicated to retrieving the black (cipher text) data resulting from the encryption process. The two simplex channels are coupled together by design but do not share any common memory or software process. This ensures that the red data and black data remain separated.

The decryption process also uses simplex channels. Another simplex channel is used to handle black (cipher text) data which is to be written to the card so that the black (cipher text) data can be decrypted. This decryption process transforms the black data into red data. An additional separate simplex channel is dedicated to retrieving the red (plain text) data resulting from the decryption process. These two simplex channels are also coupled together by design but do not share any common memory or software process. These two simplex channels are also separate from the two other simplex channels used in the encryption processing. This ensures that red data and black data remain separated.

In a preferred embodiment of the present invention, the command data through the command channels is not sensitive and does not require encryption or decryption. A single process writes a command to the device driver and reads the results back. Thus, two simplex channels for the command channel are coupled to form an effective "half duplex" interface. The data written or read on the command channel does not need to be identified as plain or encrypted text.

In a preferred embodiment of the present invention, the data channels have a more detailed specification. Traffic passing through the data traffic channels is transformed from red data to black data or from black data to red data as a result of the encryption or decryption function respectively. A unique channel is required to handle the red data and the encrypted text data. A total of four "handles" to the device driver is required to support the encryption and decryption of a full duplex voice or data link. These channels are a red data write channel, a black data read channel, a black data write channel, and a red data read channel. The red data write channel is used to write data to be encrypted. The black data read channel is used to read data that was encrypted. The black data write channel is used to write data to be decrypted. The red data read channel is used to read data that was decrypted.

FIG. 1 shows a block diagram of a cryptographic system in accordance with a preferred embodiment of the present invention. Cryptographic system 100 comprises client application(s) 102, device driver 104, and cryptographic card 106. Command traffic between client application 102 and device driver 104 flows in command interface 110. Data traffic between client application 102 and device driver 104 flows in data interface 112. Command traffic and data traffic between device driver 104 and cryptographic card 106 flow through PCMCIA interface 114.

Figure 2:
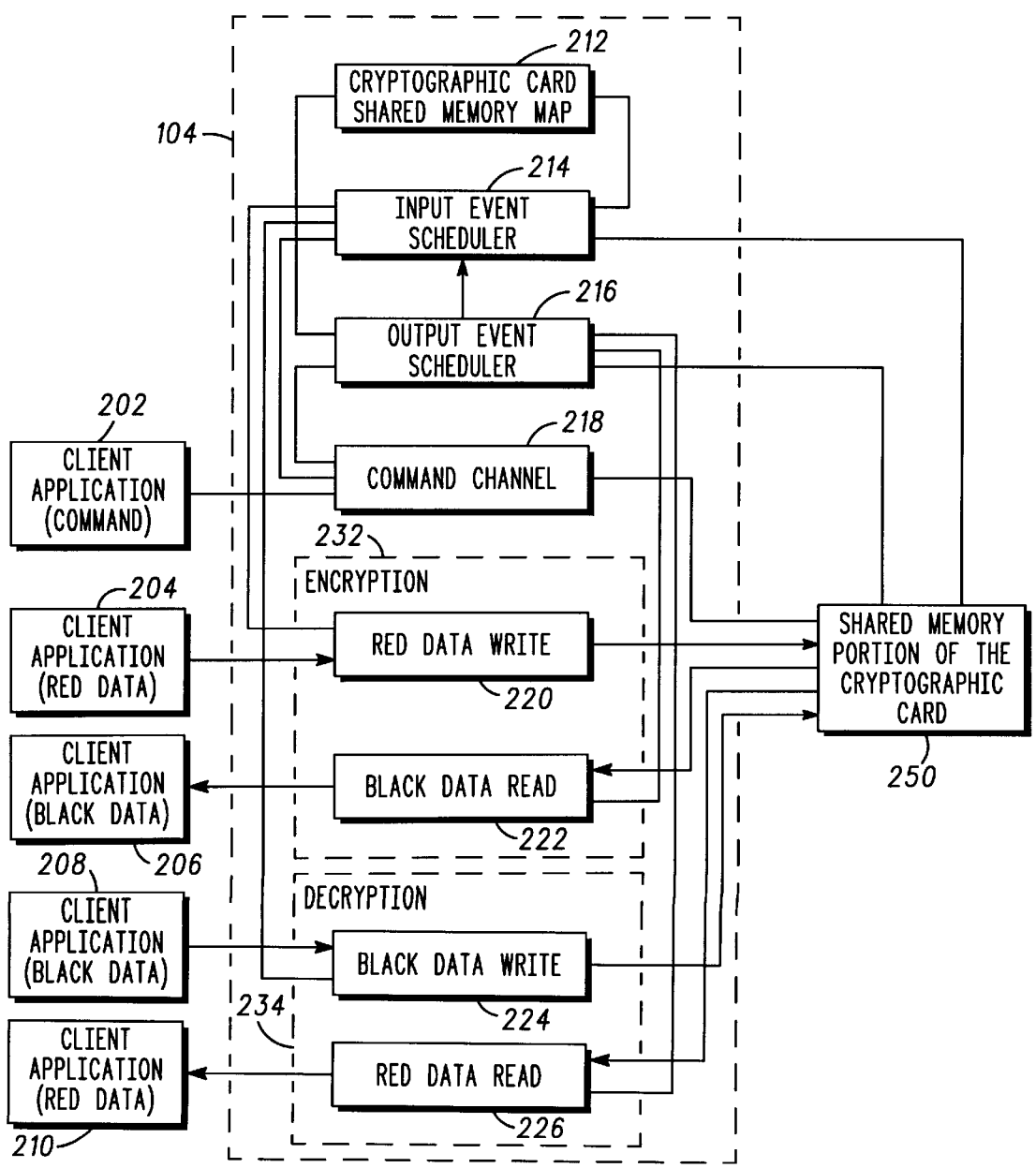
FIG. 2 shows a block diagram of a device driver in a cryptographic system in accordance with a preferred embodiment of the present invention.

FIG. 2 shows a block diagram of a device driver in a cryptographic system in accordance with a preferred embodiment of the present invention. Device driver 104 (FIG. 1) comprises: cryptographic card shared memory map 212, input event scheduler 214, output event scheduler 216, command channel 218, red data write channel 220, black data read channel 222, black data write channel 224, and red data read channel 226. Command channels 218 in device driver 104 (FIG. 1) provide separate command interfaces between client command applications 202 and cryptographic card shared memory 250. Data channels 220–226 in device driver 104 (FIG. 1) provide separate data interfaces between client applications 204–210 and cryptographic card shared memory 250.

Cryptographic card shared memory map 212 is unique to the particular cryptographic card device being used. In a preferred embodiment of the present invention, a FORTEZZA PLUS cryptographic card is used. The FORTEZZA PLUS cryptographic card requires that a command mailbox be established. In a preferred embodiment, event schedulers are used to build and verify commands or chains of commands for the card in this mailbox.

Cryptographic card shared memory map 212 contains pointers to particular locations in the shared memory where command channel read and command channel write commands store data. Cryptographic card shared memory map 212 also contains pointers to other locations in the shared memory where read data channels and write data channels store data. In a preferred embodiment, four data channels are established for each command channel.

Client command applications 202 are any applications which have permission to send commands to and/or receive command responses from the cryptographic card.

Command channels 218 allow client command applications 202 to send commands to and/or receive command responses from the cryptographic card. These commands can result in card information being retrieved. For example, card information can comprise the number and types of keysets supported by the cryptographic card. These commands can also cause administrative actions to be performed. For example, administrative actions can comprise challenging the cryptographic card as a means of verifying the cryptographic card's trustworthiness. In addition, these commands can cause traffic channel configuration processes to be performed. For example, traffic channel configuration can include assigning a particular keyset to a particular channel and then generating a key for it.

Command channel 218 further comprises a command data write object for processing command requests from the plurality of client applications and a command data read object for processing command responses from the cryptographic card.

Encryption channel 232 provides a link between the client applications and the cryptographic card. Encryption channel 232 is used for processing encryption data between the client applications and the cryptographic card.

Decryption channel 234 provides another link between the client applications and the cryptographic card. Decryption channel 234 is used for processing decryption data between the client applications and the cryptographic card.

Client applications 204–210 are any applications which have permission to send data to and receive data from the cryptographic card. Data channels 220–226 allow client applications 204–210 to send data to and receive data from the cryptographic card. As illustrated in FIG. 2, data channels 220–226 are simplex channels with a single direction allowed for data movement.

In a preferred embodiment, first client application 204 is an application that has data which requires encryption. This sensitive data must be kept separate from other data. Red data write channel 220 is used to transfer this sensitive data to the cryptographic card. After this sensitive data has been encrypted by the cryptographic card, the sensitive data becomes non-sensitive data. Black data read channel 222 is used to transfer this non-sensitive data back to a second client application 206. Again, this non-sensitive data is not allowed to be exchanged with or over-written by any other data. In addition, the design also ensures that the correct client application receives the correct data. The first client application's red data is kept separate from the second client application's black data by design.

In a preferred embodiment, third client application 208 is an application that has data which requires decryption. This is non-sensitive data, but it must also be kept separate from other data. Black data write channel 224 is used to transfer this non-sensitive data to the cryptographic card. After this non-sensitive data has been decrypted by the cryptographic card, the non-sensitive data becomes sensitive. Red data read channel 226 is used to transfer this sensitive data back to a fourth client application 210. Again, this sensitive data is not allowed to be exchanged with or over-written by any other data. In addition, the design also ensures that the correct client application receives the correct data. The third client application's black data is kept separate from the fourth client application's red data by design.

Device driver 104 (FIG. 1) also comprises output event scheduler 216. Output event scheduler 216 is linked to command channel 218, black data read channel 222, red data read channel 226, cryptographic card shared memory map 212, and shared memory 250. Output event scheduler 216 controls the interface between the device driver and the cryptographic card.

Device driver 104 (FIG. 1) also comprises input event scheduler 214. Input event scheduler 214 is linked to command channel 218, red data write channel 220, black data write channel 224, cryptographic card shared memory map 212, and shared memory 250. Input event scheduler 214 controls the interface between the client applications and the device driver.

Input event scheduler 214 is linked to output event scheduler 216 and provides coordination of the scheduling of output event scheduler 216 and input event scheduler 214. Input event scheduler 214 determines the priority for transferring command data in the fail-safe command channel, determines the priority for transferring encryption data in the fail-safe encryption channel, and determines the priority for transferring decryption data in the fail-safe decryption channel.

Red data write channel 220 comprises, a red data write object for performing the processing, an object handle which is accessible to the client applications, and a buffer for storing and transferring the data to be encrypted. Black data read channel 222 comprises, a black data read object for performing the processing, another object handle which is accessible to the client applications; and another buffer for storing and transferring encrypted data.

Black data write channel 224 comprises, a black data write object for performing the processing, an object handle which is accessible to the client applications, and a buffer for storing and transferring the data to be decrypted. Red data read channel 226 comprises, a red data read object for performing the processing, an object handle which is accessible to the client applications, and a buffer for storing and transferring encrypted data.

Command channel 218 comprises: a command channel write object, a command channel write object handle, a command channel read object and a command channel read object handle. The command channel write object and its handle are used to send command requests to the cryptographic card. The command channel read object and its handle are used to received command responses from the cryptographic card.

Figure 3:
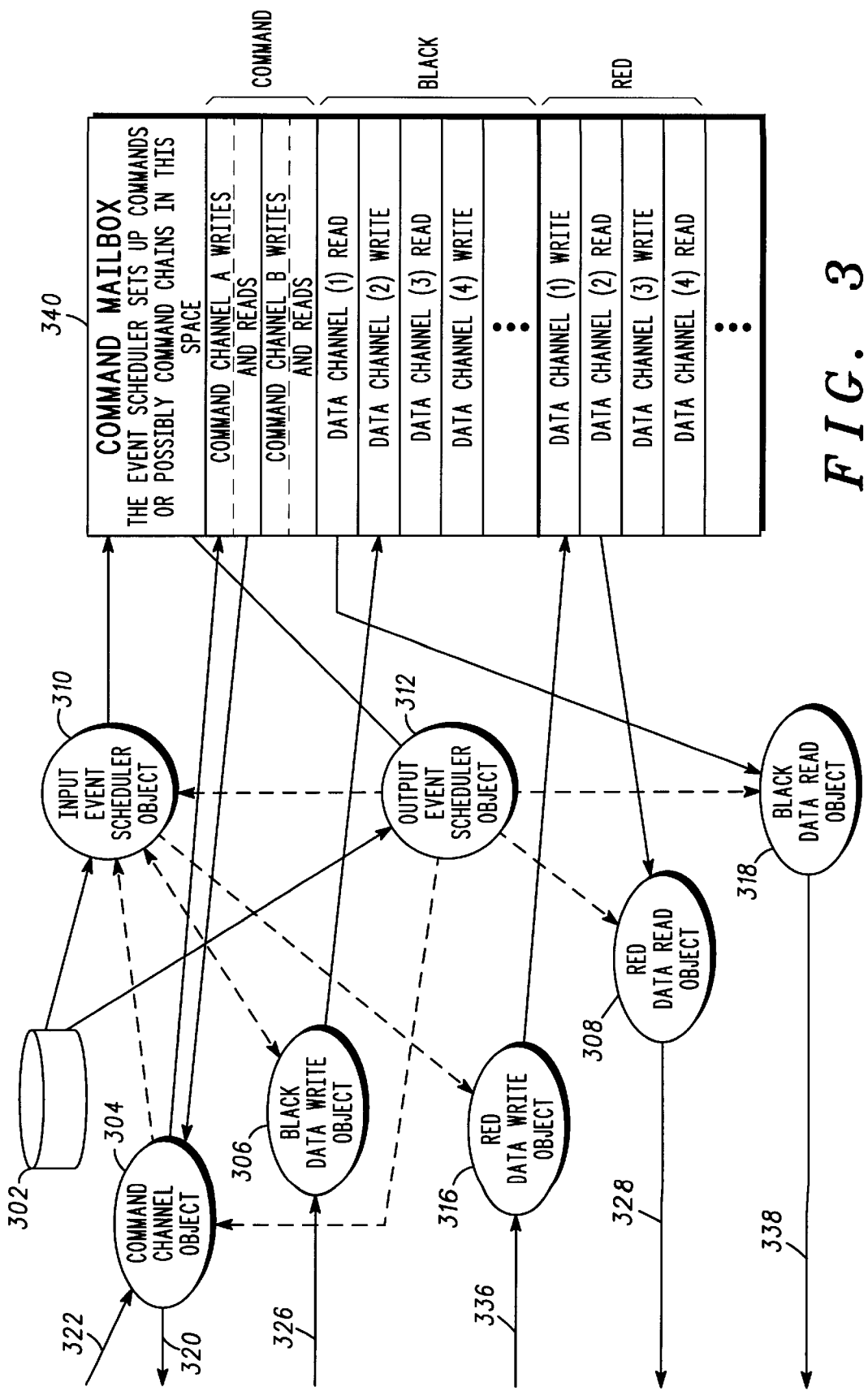
FIG. 3 shows a diagram which illustrates the fail-safe interface between the application domain and the kernel mode device driver domain in accordance wit preferred embodiment of the present invention.

FIG. 3 shows a diagram which illustrates the fail-safe interface between the application domain and the kernel mode device driver domain in accordance with a preferred embodiment of the present invention. Command channel object 304 controls the movement of command requests and command responses between the client applications and the cryptographic card. Command channel object 304 has a command data read object handle 320 and a command data write object handle 322. Object handles are used to provide restricted access to the objects. A client application accesses an object by opening the handle for that object. The client application must have access rights to that object handle which define what the client application can do with the object. Command data write object handle 322 allows the client application to send commands to the cryptographic card. Command data read object handle 320 allows the client application to receive command responses back from the cryptographic card. Command channel object 304 isolates command data traffic from data traffic by providing a separate channel for command data traffic between the plurality of client applications and the cryptographic card.

Shared memory management object 302 is a memory map for the shared memory 340 and contains a set of pointers to the various locations in the shared memory. Shared memory management object 302 represents the cryptographic card and a unique map is created for each individual cryptographic device. In a preferred embodiment, the cryptographic device is a FORTEZZA PLUS card.

In the shared memory, for example, a command channel could be established with an associated command channel read part and a command channel write part. Along with this command channel, there is a black data read channel, a black data write channel, a red data read channel, and a red data write channel. A second command channel is associated with a second set of data channels. These data channels are a black data read channel, a black data write channel, a red data read channel, and a red data write channel. In a preferred embodiment of the present invention, all channels which define the memory ranges for the cryptographic card are separated by a Hamming distance of two. This prevents a single bit error from causing an over-write or a write error which would cause red data to be switched with black data.

In a preferred embodiment of the present invention, shared memory management object 302 comprises several sets of pointers. A first set of data channel pointers which point to locations in the shared memory space where data is stored which is to be encrypted by the cryptographic card. A second set of data channel pointers which point to locations in the shared memory space where data is stored which has been encrypted by the cryptographic card. A third set of data channel pointers which point to locations in the shared memory space where data is stored which is to be decrypted by the cryptographic card. A fourth set of data channel pointers which point to locations in the shared memory space where data is stored which has been decrypted by the cryptographic card.

Shared memory management object 302 comprises: a command mailbox pointer which points to a location in the shared memory where command mailbox have been established, command channel pointers which point to locations where command channels have been established. The command mailbox comprises a command identification register, an input pointer register, an output pointer register, and a status register.

Red data write object 316 is used to control the movement of red data from the client applications to the cryptographic card. Red data write object 316 has a single red data write handle 336. Applications with permission to write red data to the cryptographic card have access right to this handle. Red data write object 316 provides a first channel to maintain data separation by writing red data from the plurality of client applications to the cryptographic card. Red data write object 316 performs red data write processes.

Red data write object handle 336 provides a link to one of the client applications and provides restricted access to red data write object 316. Red data write object handle 336 is accessible at a particular time to one of the client applications and is used to transfer red data.

Black data read object 318 is used to control the movement of black data from the cryptographic card to the client applications. Black data read object 318 has a single black data read handle 338. Applications with permission to read black data from the cryptographic card have access right to this handle. Black data read object 318 provides a second channel to maintain data separation by reading black data from the cryptographic card to the plurality of client applications. Black data read object 318 performs black data read processes.

Black data read object handle 338 provides a link to one of the client applications and provides restricted access to black data read object 318. Black data read object handle 338 is accessible at a particular time to one of the client applications and is used to transfer black data.

Black data write object 306 is used to control the movement of black data from the client applications to the cryptographic card. Black data write object 306 has a single black data write handle 326. Applications with permission to write black data to the cryptographic card have access right to this handle. Black data write object 306 provides a third channel to maintain data separation by writing black data from the plurality of client applications to the cryptographic card. Black data write object 306 performs black data write processes.

Black data write object handle 326 provides a link to one of the client applications and provides restricted access to black data write object 306. Black data write object handle 326 is accessible at a particular time to one of the client applications and is used to transfer black data.

Red data read object 308 is used to control the movement of red data from the cryptographic card to the client applications. Red data read object 308 has a single red data read handle 328. Applications with permission to read red data from the cryptographic card have access right to this handle. Red data read object 308 provides a fourth channel to maintain data separation by reading red data from the cryptographic card to the plurality of client applications. Red data read object 308 performs red data read processes.

Red data read object handle 328 provides a link to one of the client applications and provides restricted access to red data read object 308. Red data read object handle 328 is accessible at a particular time to one of the client applications and is used to transfer red data.

Input event scheduler object 310 controls access timing for black data write object 306, red data write object 316, and command data write handle 322 in command channel object 304. Input event scheduler object 310 uses pointers in shared memory management object 302 to set up commands. Input event scheduler object 310 uses the command mailbox portion of the shared memory to set up a single command string or a number of commands chained in a single string.

Output event scheduler object 312 controls access timing for red data read object 308, black data read object 318, and command data read handle 320 in command channel object 304. Output event scheduler object 312 uses pointers in shared memory management object 302 to ensure that the command was set up correctly. Output event scheduler object 312 uses the command mailbox portion of the shared memory to read a single command string or a number of commands chained in a single string.

FIG. 3 further illustrates the paths required to set up a security association for a user traffic application as well as the paths required to transport and secure that traffic. A single command interface and two full duplex data interfaces are shown. Alternate embodiments of the present invention can be established which support multiple command interfaces and multiple full duplex data interfaces.

The command channels and the data channels shown in FIG. 3 are grouped together to form a security group. The command channel is used to set up and control the data channels. The data channels are used exclusively to encrypt or decrypt the user data. This permits the separation of command traffic and data traffic as well as providing a single interface which effects all data channels. For example, if the security association is to be terminated for any reason, a single command to the command channel can shut down all of the data channels.

FIG. 3 illustrates how the "handles" link the device driver with client applications. For each application domain object there is a corresponding device driver object. For example, the command channel A object is shown. These objects process requests for actions which come from the application domain. The command channel object shown, for example, processes incoming command requests over a "Command Write" simplex channel. When such a command request comes in, the object generates a request to a separate object, the input event scheduler, for permission to perform a requested action. The input event scheduler notifies the channel object when it can move data into a "pre-defined slot" of memory assigned to that object in the shared memory space of the cryptographic physical device. The channel object moves this data into its slot, and the input event scheduler builds the appropriate command to the card in the command mailbox section of the shared memory space. This separation of command set up and command data movement makes the objects performing these functions simpler and less susceptible to failure.

The same separation is true for each of the data channels. Before the input event scheduler builds a command in the command mailbox of the card, it checks a card memory management shared memory map for the memory slot values which should be assigned to the input data pointers and output data pointers associated with the command. This memory map is independent of the device driver object which moves the data into the shared memory space. Thus, even if a data mover object puts data into an incorrect slot, the input event scheduler will nonetheless schedule an operation which will use the correct input and output slot assignments. The separation of the command building by the input event scheduler and the movement of data by the data mover object prevents a failure in any single process from mixing data from one simplex channel with another simplex channel.

Once the cryptographic card is signaled that there is a command to be executed, the input event scheduler's job is done. At some later point in time, the output event scheduler is activated. This is done when the cryptographic physical device finishes processing the previous command. It is the output event scheduler's job to read back the last command set up in the command mailbox and check the input and output memory assignments against those allowed by the cryptographic card memory management database. When this check passes, the output event scheduler alerts the appropriate reader object that it has data to retrieve from the cryptographic card memory slot associated with it.

FIG. 4 shows a diagram of the memory map for the shared memory in the cryptographic card in accordance with a preferred embodiment of the present invention. In a preferred embodiment, the cryptographic card is a FORTEZZA PLUS card. The FORTEZZA PLUS card requires that a command mailbox be established. In this portion of the memory, single commands or multiple command chains are entered. The card recognizes information in this area of memory to be command information.

The shared memory is segmented to provide specific locations for command data, encryption data and decryption data. Command data comprises command read data and command write data. Encryption data comprises red data which passes through a first simplex data channel from a client application to a cryptographic card and black data which passes through a second simplex data channel from a cryptographic card to a client application. Decryption data comprises black data which passes through a third simplex data channel from a client application to a cryptographic card and red data which passes through a fourth simplex data channel from a cryptographic card to a client application.

In a preferred embodiment, four simplex data channels are established for each command channel. For example, a command channel A and command channel B could be established with their associated command channel read and command channel write parts. Along with command channel A, there is a data channel (1) read, data channel (1) write, data channel (2) read, data channel (2) write. Along with command channel B, there is a data channel (3) read, data channel (3) write, data channel (4) read, and data channel (4) write. In a preferred embodiment of the present invention, all channels are separated by a Hamming distance of two. This fail-safe mechanism prevents a single bit error from causing an over-write or a write error which could cause red data to be switched with black data.

Figure 5:
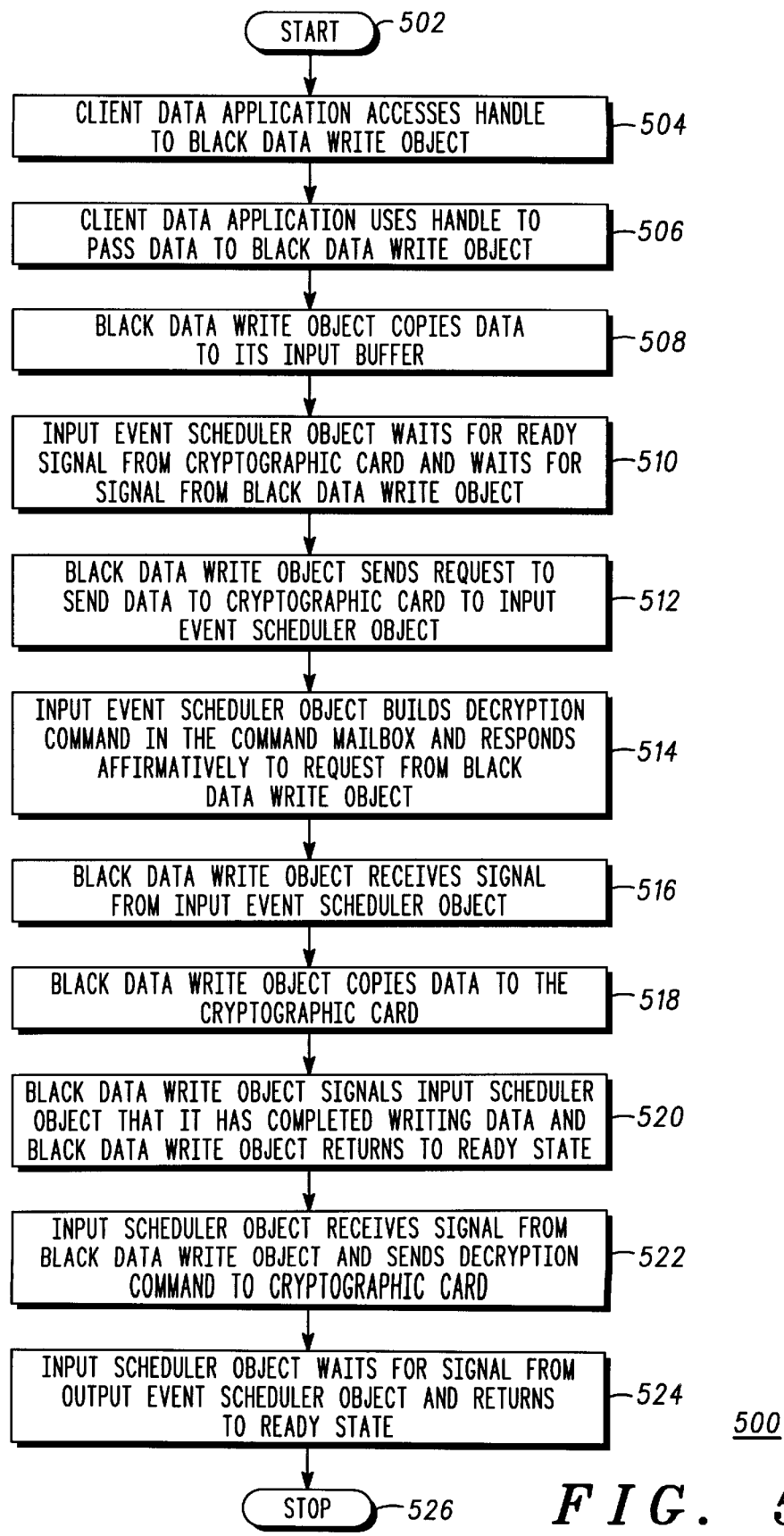
FIG. 5 shows a flow diagram for the first part of a decryption procedure performed in accordance with a preferred embodiment of the present invention.

FIG. 5 shows a flow diagram for the first part of a decryption procedure performed in accordance with a preferred embodiment of the present invention. Procedure 500 illustrates the steps required to pass write data from a client application to the cryptographic card to be decrypted. Procedure 500 starts in step 502. In step 502, both the input event scheduler object and the black write object are in a ready state. Procedure 500 starts when a client data application determines that it has data that requires decryption. The client data application can generate a decryption command. In step 504, the client data application accesses the handle to a black data write object. In step 506, the client data application uses the handle to pass data to the black data write object. In step 508, the black data write object transfers the data into an internal buffer which is only accessible to the black data write object.

In step 510, the input event scheduler waits for a ready signal from the cryptographic card and waits for a signal from a black data write object. The input event scheduler object monitors the status register for the cryptographic card to determine when the cryptographic card is ready to accept data. In step 512, the black data write object signals the input event scheduler object that it has data in its buffer which it would like to transfer to the cryptographic card. In step 514, the input event scheduler builds a decryption command in the command mailbox of the cryptographic card and responds affirmatively to the request from the black data write object. That is, when the input event scheduler object determines that the cryptographic card is in a ready state, the input event scheduler signals the black data write object.

In step 516, the black data write object receives the signal from the input event scheduler object. In step 518, the black data write object copies the data to a fixed location in the cryptographic card shared memory. In some embodiments of the present invention, the black data write object erases its internal buffer so that the data cannot be copied to any other location. In step 520, the black data write object signals the input event scheduler that it has completed its write operation and returns to a ready state. In step 522, the input event scheduler object receives the signal from the black data write object and sends the decryption command to the cryptographic card. In step 524, the input event scheduler object waits for a ready signal from the output event scheduler before returning to the ready state. In step 526, procedure 500 ends.

Figure 6:
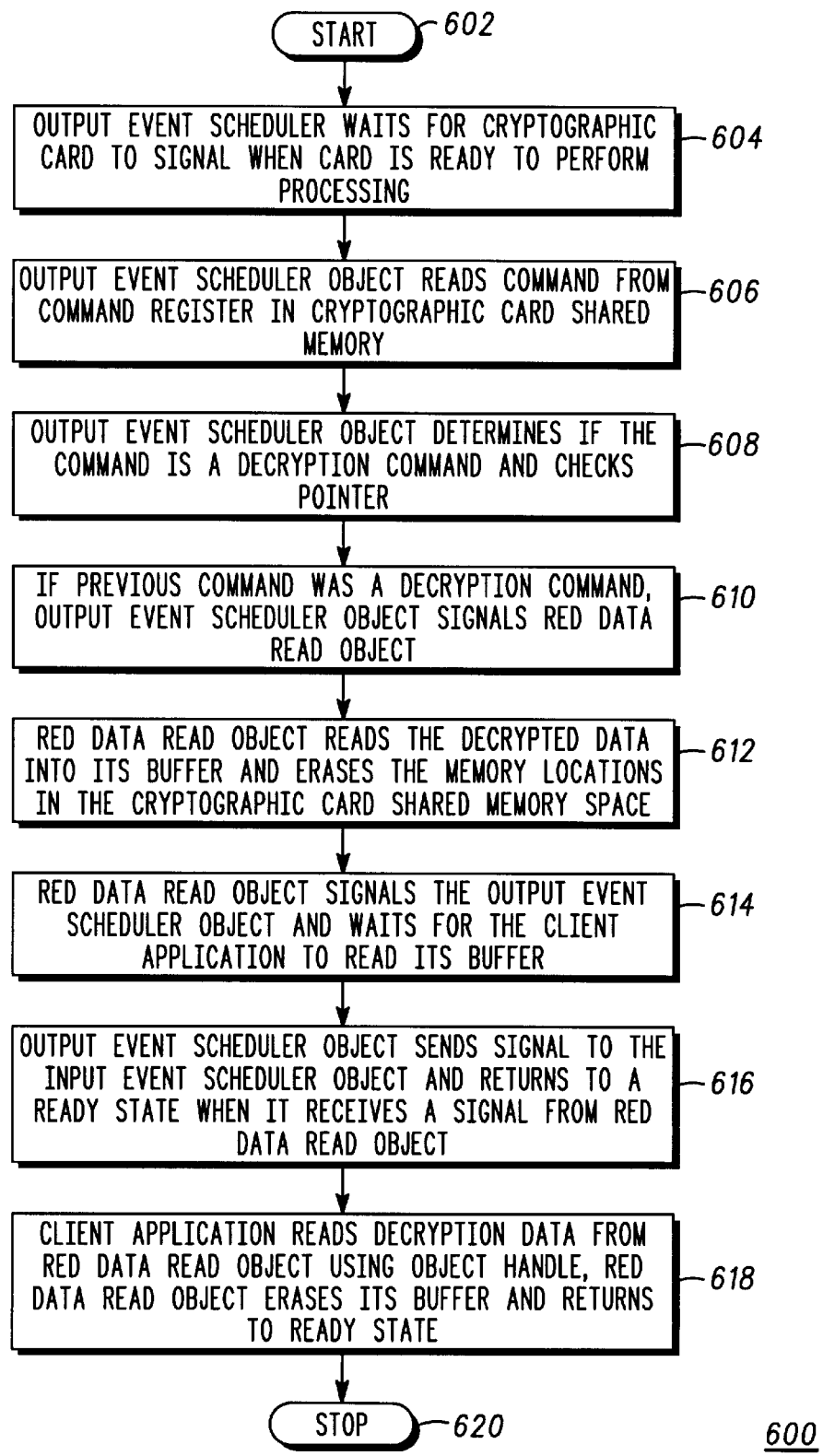
FIG. 6 shows a flow diagram for the second part of a decryption procedure performed in accordance with a preferred embodiment of the present invention.

FIG. 6 shows a flow diagram for the second part of a decryption procedure performed in accordance with a preferred embodiment of the present invention. Procedure 600 illustrates the steps required to pass read data from a cryptographic card to the client application after being decrypted. Procedure 600 starts in step 602. This results when the cryptographic card determines that it has completed a decryption command and has data ready that was decrypted. The cryptographic card uses the cryptographic card status register to signal the device driver that it has data which is ready to be transferred.

In step 604, the output event scheduler object monitors the cryptographic card status register and waits for a ready signal. In step 606, the output event scheduler object reads the last command from the command register in the cryptographic card shared memory. In step 608, the output event scheduler object determines whether the command is a decryption command. In step 610, when the last command was a decryption command, the output event scheduler object signals the red data read object.

In step 612, the red data read object transfers the data into an internal buffer which is accessible to red data read object. The red data read object also erases the memory locations in the cryptographic card shared memory. This helps ensure that the data cannot be compromised. In step 614, the red data read object signals the output event scheduler object that it has copied the data out of the cryptographic card. In step 616, the output event scheduler object signals the input event scheduler object and returns to a ready state when the output event scheduler object receives the signal from the red data read object.

In step 618, the client application reads the decrypted data from the red data read object by accessing the read handle for the red data read object. When the client application has been given the decrypted data the red data read object erases its internal buffer. Also, the red data read object returns to the ready state. In step 620, procedure 600 ends.

Figure 7:
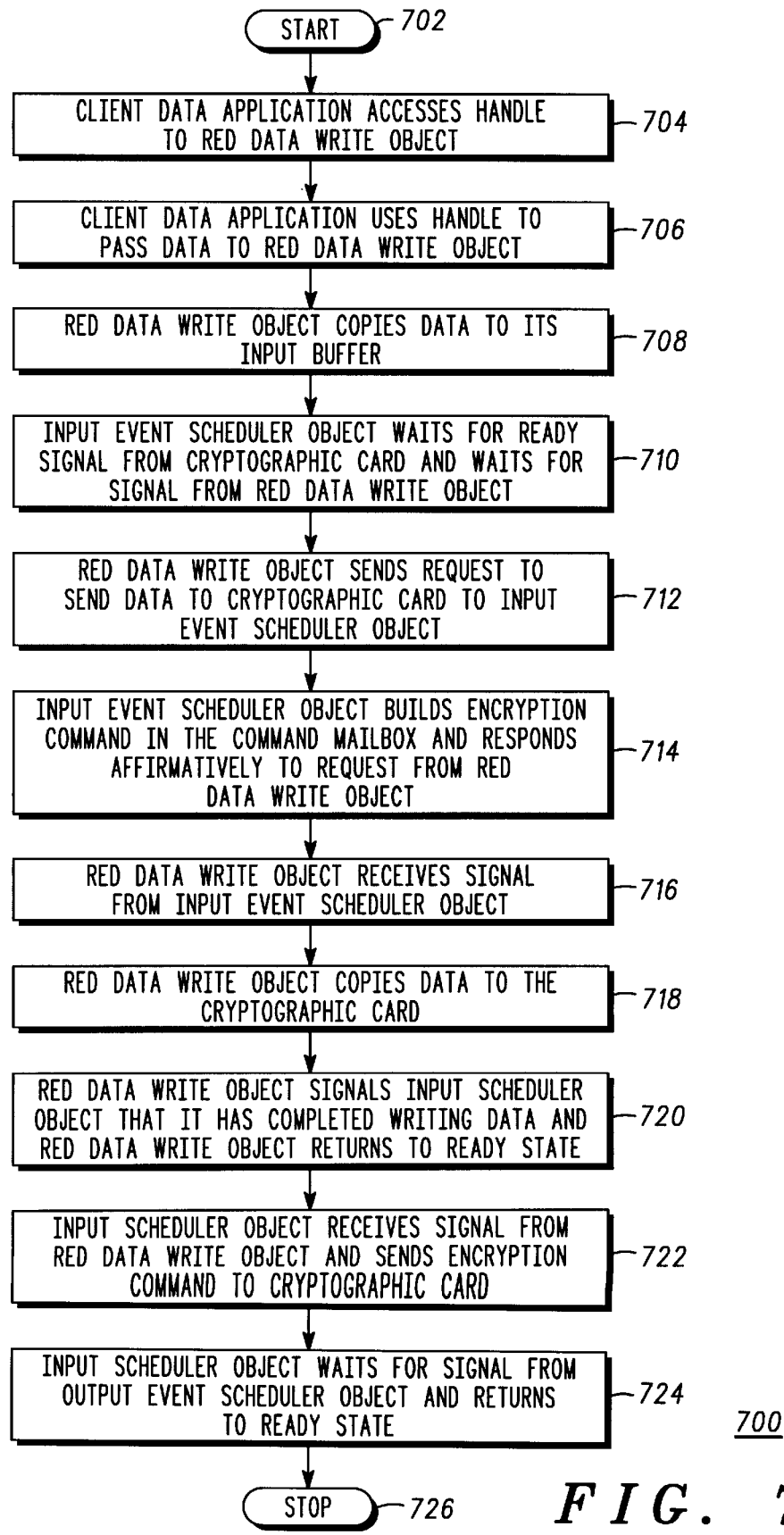
FIG. 7 shows a flow diagram for the first part of an encryption procedure performed in accordance with a preferred embodiment of the present invention.

FIG. 7 shows a flow diagram for the first part of an encryption procedure performed in accordance with a preferred embodiment of the present invention. Procedure 700 illustrates the steps required to pass write data from a client application to the cryptographic card to be encrypted. Procedure 700 starts in step 702. In step 702, both the input event scheduler object and the red write object are in a ready state. Procedure 700 starts when a client data application determines that it has data that requires encryption. The client data application can generate an encryption command. In step 704, the client data application accesses the handle to a red data write object. In step 706, the client data application uses the handle to pass data to the red data write object. In step 708, the red data write object transfers the data into an internal buffer which is only accessible to the red data write object.

In step 710, the input event scheduler waits for a ready signal from the cryptographic card and waits for a signal from a red data write object. The input event scheduler object monitors the status register for the cryptographic card to determine when the cryptographic card is ready to accept data. In step 712, the red data write object signals the input event scheduler object that it has data in its buffer which it would like to transfer to the cryptographic card. In step 714, the input event scheduler builds a decryption command in the command mailbox of the cryptographic card and responds affirmatively to the request from the red data write object. That is, when the input event scheduler object determines that the cryptographic card is in a ready state, the input event scheduler signals the red data write object.

In step 716, the red data write object receives the signal from the input event scheduler object. In step 718, the red data write object copies the data to a fixed location in the cryptographic card shared memory and erases its buffer. In step 720, the red data write object signals the input event scheduler that it has completed its write operation and returns to a ready state. In step 722, the input event scheduler object receives the signal from the red data write object and sends the encryption command to the cryptographic card. In step 724, the input event scheduler object waits for a ready signal from the output event scheduler before returning to the ready state. In step 726, procedure 700 ends.

Figure 8:
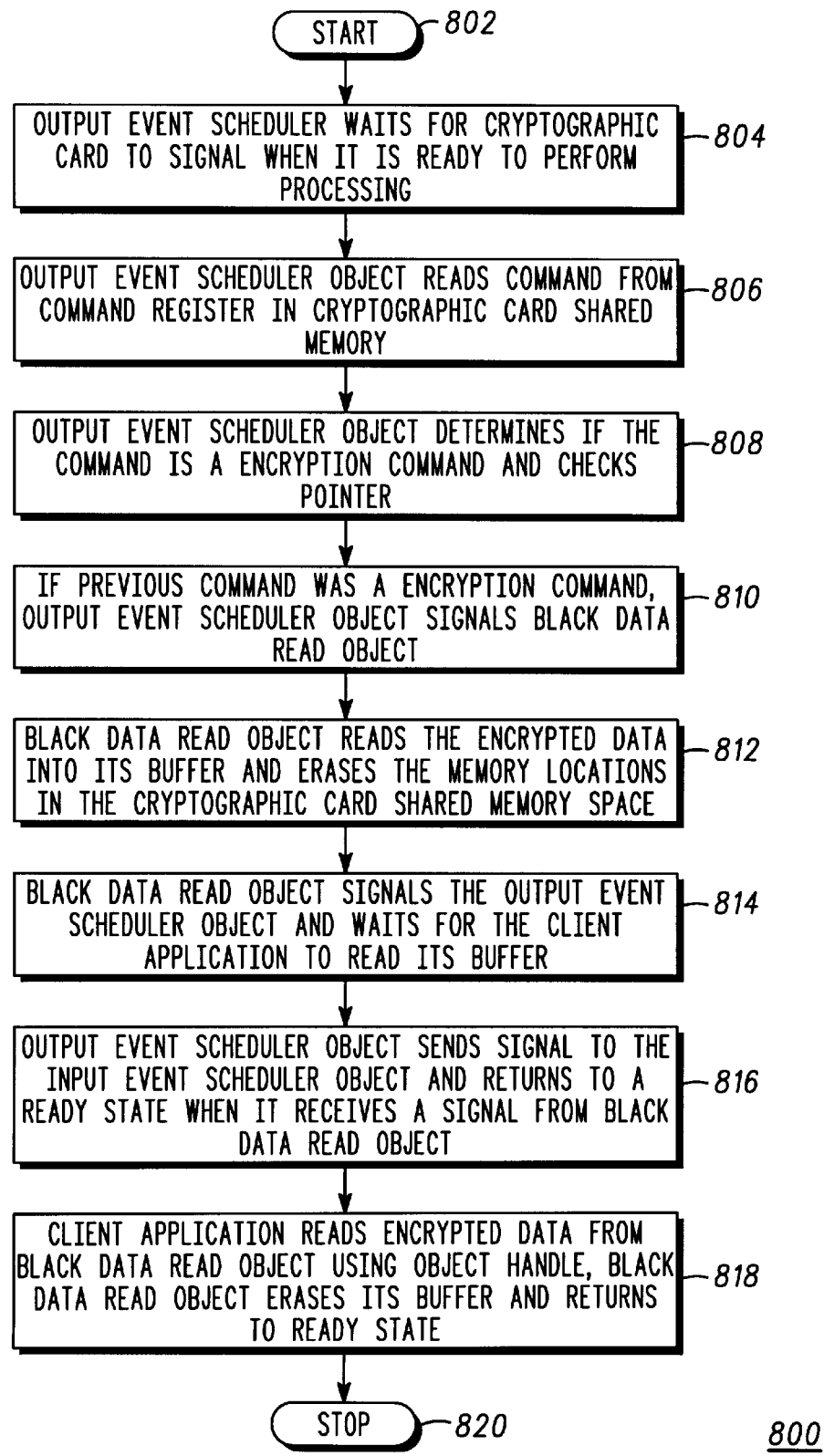
FIG. 8 shows a flow diagram for the second part of an encryption procedure performed in accordance with a preferred embodiment of the present invention.

FIG. 8 shows a flow diagram for the second part of an encryption procedure performed in accordance with a preferred embodiment of the present invention. Procedure 800 illustrates the steps required to pass read data from a cryptographic card to the client application after being encrypted. Procedure 800 starts in step 802. This results when the cryptographic card determines that it has completed an encryption command and has data ready that was encrypted. The cryptographic card uses the cryptographic card status register to signal the device driver that it has data which is ready to be transferred.

In step 804, the output event scheduler object monitors the cryptographic card status register and waits for a ready signal. In step 806, the output event scheduler object reads the last command from the command register in the cryptographic card shared memory. In step 808, the output event scheduler object determines whether the command is an encryption command. In step 810, when the last command was an encryption command, the output event scheduler object signals the black data read object.

In step 812, the black data read object transfers the data into an internal buffer which is accessible to black data read object. The black data read object also erases the memory locations in the cryptographic card shared memory. This helps ensure that the data cannot be compromised. In step 814, the black data read object signals the output event scheduler object that it has copied the data out of the cryptographic card. In step 816, the output event scheduler object signals the input event scheduler object and returns to a ready state when the output event scheduler object receives the signal from the black data read object.

In step 818, the client application reads the decrypted data from the black data read object by accessing the read handle for the black data read object. When the client application has been given the decrypted data, the black data read object erases its internal buffer. Also, the black data read object returns to the ready state. In step 820, procedure 800 ends.

The present invention has been described above with reference to a preferred embodiment. However, those skilled in the art will recognize that changes and modifications can be made in this embodiment without departing from the scope of the present invention. For example, while a preferred embodiment has been described in terms of a particular cryptographic card, other device and methods can also be employed. In addition, the present invention need not be restricted to use only in connection with a Windows NT operating system. Those skilled in the art may easily adapt the teaching of the present invention for use with other operating systems. Accordingly, these and other changes and modifications which are obvious to those skilled in the art are intended to be included within the scope of the present invention.

We claim:

1. A device driver running on a processor for providing a fail-safe interface between a plurality of client applications and a cryptographic card which includes shared memory comprising:

a command channel linked to a client application and to said cryptographic card, said command channel for processing command data traffic between said client application and said cryptographic card;

an encryption channel linked to said plurality of client applications and to said cryptographic card, said encryption channel for processing encryption data between said plurality of client applications and said cryptographic card;

a decryption channel linked to said plurality of client applications and to said cryptographic card, said decryption channel for processing decryption data between said plurality of client applications and said cryptographic card;

a shared memory map for mapping said shared memory of said cryptographic card to a set of pointers; and an event scheduler linked to said command channel, to said encryption channel, to said decryption channel, and to said shared memory map, said event scheduler controlling operation of said command channel, of said encryption channel, and of said decryption channel via said set of pointers.

2. The device driver as claimed in claim 1, wherein said command channel comprises:

a command data write object linked to said cryptographic card for processing command requests from said client application; and a command data write object handle linked to said client application and to said command data write object for providing restricted access to said command data write object.

3. The device driver as claimed in claim 1, wherein said command channel comprises:

a command data read object linked to said cryptographic card for processing command responses from said cryptographic card; and a command data read object handle linked to said client application and to said command data read object for providing restricted access to said command data read object.

4. The device driver as claimed in claim 1, wherein said encryption channel comprises:

a red data write object linked to said cryptographic card for performing a red data write process; and a red data write object handle linked to one of said plurality of client applications and to said red data write object for providing restricted access to said red data write object.

5. The device driver as claimed in claim 1, wherein said encryption channel comprises:

a black data read object linked to said cryptographic card for performing a black data read process; and a black data read object handle linked to one of said plurality of client applications and to said black data read object for providing restricted access to said black data read object.

6. The device driver as claimed in claim 1, wherein said decryption channel comprises:

a black data write object linked to said cryptographic card for performing a black data write process; and a black data write object handle linked to one of said plurality of client applications and to said black data write object for providing restricted access to said black data write object.

7. The device driver as claimed in claim 1, wherein said decryption channel comprises:

a red data read object linked to said cryptographic card for performing a red data read process; and a red data read object handle linked to one of said plurality of client applications and to said red data read object for providing restricted access to said red data read object.

8. The device driver as claimed in claim 1, wherein said shared memory map comprises:

a command mailbox pointer indicating a command mailbox in said shared memory;

command channel pointers indicating a plurality of command channels in said shared memory;

read data channel pointers indicating a plurality of read data channels in said shared memory; and write data channel pointers indicating a plurality of write data channels in said shared memory.

9. The device driver as claimed in claim 1, wherein said event scheduler comprises:

an input event scheduler object for controlling input from said plurality of client applications to said command channel, to said encryption channel, and to said decryption channel;

an output event scheduler object for controlling output to said cryptographic card from said command channel, from said encryption channel, and from said decryption channel; and said input event scheduler object coordinating scheduling of said input event scheduler object and said output event scheduler object, said input event scheduler object linked to said output event scheduler object.

10. A method for using a device driver running on a processor to provide a fail-safe interface between a plurality of client applications and a cryptographic card comprising the steps of:

processing command data between one of said plurality of client applications and said cryptographic card;

processing encryption data between another one of said plurality of client applications and said cryptographic card;

processing decryption data between said another one of said plurality of client applications and said cryptographic card;

controlling said step of processing command data, said step of processing encryption data, and said step of processing decryption data to allow data transmissions between said plurality of client applications and said cryptographic card, said data transmissions including said command data, said encryption data, and said decryption data; and mapping a shared memory of said cryptographic card with said command data, said encryption data, and said decryption data.

11. The method as claimed in claim 10, wherein the step of processing command data comprises the steps of:

providing restricted access to a command data write object by a command data write object handle;

linking said command data write object to said shared memory;

processing command requests from said one of said plurality of client applications by said command data write object;

providing restricted access to a command data read object by a command data read object handle;

linking said command data read object to said shared memory; and processing command responses from said shared memory by said command data read object.

12. The method as claimed in claim 10, wherein the step of processing encryption data comprises the steps of:

providing restricted access to a red data write object by a red data write object handle;

linking said red data write object to said shared memory;

writing data to be encrypted to said shared memory by said red data write object;

providing restricted access to a black data read object by a black data read object handle;

linking said black data read object to said shared memory; and reading encrypted data from said shared memory by said black data read object.

13. The method as claimed in claim 10, wherein the step of processing decryption data comprises the steps of:

providing restricted access to a black data write object by a black data write object handle;

linking said black data write object to said shared memory;

writing data to be decrypted to said shared memory by said black data write object;

providing restricted access to a red data read object by a red data read object handle;

linking said red data read object to said shared memory; and reading decrypted data from said shared memory by said red data read object.

14. The method as claimed in claim 10, wherein the step of controlling comprises the steps of:

determining a priority for transferring said command data;

determining a priority for transferring said encryption data; and determining a priority for transferring said decryption data.

15. The method as claimed in claim 10, wherein the step of mapping comprises the steps of:

segmenting said shared memory;

providing a set of pointers for mapping said command data; and pointing with said set of pointers to a segment of said shared memory for storing said command data.

16. The method as claimed in claim 10, wherein the step of mapping comprises the steps of:

segmenting said shared memory;

providing a set of pointers for mapping said encryption data; and pointing with said set of pointers to a segment of said shared memory for storing said encryption data.

17. The method as claimed in claim 10, wherein the step of mapping comprises the steps of:

segmenting said shared memory;

providing a set of pointers for mapping said decryption data; and pointing with said set of pointers to a segment of said shared memory for storing said decryption data.

18. A method for using a fail-safe device driver running on a processor to pass data between a client application and a cryptographic card comprising the steps of:

passing write data from said client application to a write object by a write object handle;

writing by said write object said write data to said cryptographic card;

controlling said write object by an input event scheduler object;

linking said write object to said cryptographic card by a shared memory management object;

controlling a read object by a output event scheduler object;

linking said read object to said cryptographic card by said shared memory management object;

reading read data from said cryptographic card by said read object; and passing said read data to said client application from said read object by a read object handle.

19. The method as claimed in claim 18, wherein the step of passing write data comprises the steps of:

passing command data from said client application to a command data write object by a command data write object handle;

passing red data from said client application to a red data write object by a red data write object handle; and passing black data from said client application to a black data write object by a black data write object handle.

20. The method as claimed in claim 18, wherein the step of writing comprises the steps of:

writing command data to said cryptographic card by a command data write object when said write data is command data;

writing red data to said cryptographic card by a red data write object when said write data is red data; and writing black data to said cryptographic card by a black data write object when said write data is black data.

21. The method as claimed in claim 18, wherein the step of controlling said write object comprises the steps of:

monitoring a status register for said cryptographic card;

determining whether said cryptographic card is ready to receive data;

signaling said write object when said cryptographic card is ready to receive data; and building a write command in a command register for said cryptographic card.

22. The method as claimed in claim 18, wherein the step of linking said write object comprises the steps of:

obtaining a pointer from a shared memory management object, said pointer pointing to a location in shared memory for transferring said write data; and transferring said write data to said cryptographic card by said write object via said pointer.

23. The method as claimed in claim 18, wherein the step of controlling a read object comprises the steps of:

monitoring a status register for said cryptographic card;

determining whether said cryptographic card is ready to send data;

signaling said read object when said cryptographic card is ready to send data; and verifying a command in a command register for said cryptographic card.

24. The method as claimed in claim 18, wherein the step of linking a read object comprises the steps of:

obtaining a pointer from a shared memory management object, said pointer pointing to a location in shared memory for transferring said read data; and transferring said read data from said cryptographic card by said read object via said pointer.

25. The method as claimed in claim 18, wherein the step of reading comprises the steps of:

reading command data from said cryptographic card by a command data read object when said read data is command data;

reading black data from said cryptographic card by a black data read object when said read data is black data; and reading red data from said cryptographic card by a red data read object when said read data is red data.

26. The method as claimed in claim 18, wherein the step of passing said read data comprises the steps of:

passing command data from command data read object to said client application by a command data read object handle;

passing black data from a black data read object to said client application by a black data read object handle; and passing red data from a red data read object to said client application by a red data read object handle.

* * * * *